United States Patent
Hussey et al.

(10) Patent No.: US 7,455,741 B2
(45) Date of Patent: Nov. 25, 2008

(54) GENERANT BEADS FOR FLEXIBLE APPLICATIONS

(75) Inventors: Brett Hussey, Bountiful, UT (US); Douglas R Tingey, North Logan, UT (US); Dario G. Brisighella, Jr., North Logan, UT (US)

(73) Assignee: Autoliv ASP, Inc., Ogden, UT (US)

( * ) Notice: Subject to any disclaimer, the term of this patent is extended or adjusted under 35 U.S.C. 154(b) by 50 days.

(21) Appl. No.: 11/326,528

(22) Filed: Jan. 5, 2006

(65) Prior Publication Data
US 2007/0151640 A1    Jul. 5, 2007

(51) Int. Cl.
C06B 29/02    (2006.01)
C06B 47/00    (2006.01)
D03D 23/00    (2006.01)

(52) U.S. Cl. .......................... 149/77; 149/2; 149/109.4
(58) Field of Classification Search ................ 149/77, 149/2, 109.4
See application file for complete search history.

(56) References Cited

U.S. PATENT DOCUMENTS

| | | | |
|---|---|---|---|
| 3,881,420 A * | 5/1975 | Smith et al. ................. 102/334 |
| 4,817,828 A | 4/1989 | Goetz | |
| 5,367,872 A | 11/1994 | Lund et al. | |
| 5,551,343 A | 9/1996 | Hock et al. | |
| 5,798,477 A * | 8/1998 | Givens et al. ................ 102/319 |
| 5,959,237 A | 9/1999 | Clement | |
| 6,527,886 B1 * | 3/2003 | Yamato et al. ................ 149/45 |
| 2006/0070739 A1 | 4/2006 | Brooks et al. | |

* cited by examiner

*Primary Examiner*—Jerry Lorengo
*Assistant Examiner*—James E McDonough
(74) *Attorney, Agent, or Firm*—Sally J Brown; Madson & Austin

(57) ABSTRACT

The present invention relates to a new type of gas generant that may be used in airbag inflators. This new type of gas generant is designed to be flexible such that it may be used in side-curtain airbag applications and other situations where flexibility of the gas generant is required or desirable. The gas generant will generally include a flexible igniter, which in some instances, will be an electrical wire. The gas generant also includes one or more beads that are made from a gas-generating material. Each of the beads has a connector passage that is designed such that the flexible igniter may be strung through the connector passage in the beads. In some instances, the connector passage will be a hole in the bead through which the flexible igniter may be passed.

16 Claims, 5 Drawing Sheets

GENERANT BEADS FOR FLEXIBLE APPLICATIONS

BACKGROUND OF THE INVENTION

Vehicle airbag systems are known in the art and have been credited with greatly increasing the overall safety of motor vehicles. Specifically, these airbag systems are designed such that during an accident, one or more airbags will be rapidly inflated and will be positioned between the vehicle occupant and the hard surfaces of the vehicle interior. These inflated airbags will inhibit the vehicle occupant from impacting the interior surfaces of the vehicle and will thus greatly reduce the likelihood that the occupant will experience significant injuries in the crash.

As is known in the art, airbag systems will generally include an inflator that is capable of rapidly producing a large quantity of gas. As its name implies, the purpose of the inflator is to "inflate" the airbag. When an accident occurs, the inflator will rapidly produce a large quantity of gas that is then channeled into the airbag. In turn, such rapid influx of gas inflates and expands the airbag and causes the airbag to become positioned in front of one or more of the interior surfaces of the vehicle. As accidents occur quickly, this inflation of the airbag must occur very rapidly—i.e., generally within approximately 100 to 150 milliseconds.

Many currently used inflators are referred to as "pyrotechnic" inflators in that these devices create the large quantity of gas via a pyrotechnic material. Pyrotechnic materials are generally solid materials that are designed such that when ignited, they undergo a chemical reaction that results in the production of a gaseous product. One of the first pyrotechnic materials used was sodium azide ($NaN_3$) which is a solid, white compound that may be ignited/combusted to produce large quantities of nitrogen gas ($N_2$). Other pyrotechnic materials have also been used. As is known in the art, the pyrotechnic materials used in inflators are generally selected such that the resulting gas produced in the chemical reaction is non-toxic and non-corrosive and thus may be safely used/inhaled by humans.

As experience with pyrotechnic inflators has increased, new and additional pyrotechnic materials have been developed to meet the needs of a particular application. For example, many pyrotechnic materials are pressed into "wafer" shapes so that they may be easily stacked or arranged in the inflator. Examples of such types of wafer shapes may be found in U.S. Pat. Nos. 5,551,343, 4,817,828, and 5,367,872, which patents are expressly incorporated herein by reference.

Other types of pyrotechnic materials include one or more additives that are designed to change the chemical properties of the composition. For example, various types of "flexible" pyrotechnic materials have been developed by adding silicon or other types of rubberized binder materials to the overall pyrotechnic composition. These additives are often referred to as "flexible binding materials." After the flexible binding material has been added, the resulting pyrotechnic material is a relatively pliant material that may be used in situations (such as "side-curtain" airbag systems) in which the inflator must fit into curved, tightly-packed vehicle surfaces.

Unfortunately, the inclusion of flexible binding materials within the pyrotechnic materials results in unwanted consequences. For example, during ignition/combustion of the pyrotechnic material, the flexible binding materials will also undergo a chemical reaction and will produce a product that is undesirable and must be dealt with appropriately.

Perhaps more importantly, the addition of flexible binding materials to the pyrotechnic material may affect the burn rate of the pyrotechnic material. The burn rate of the pyrotechnic material measures how fast the solid pyrotechnic material will react to form the gaseous product. As noted above, most airbag applications require a sufficient burn rate such that the airbag will be inflated in 150 milliseconds or less. As flexible binding materials generally do not burn or react as rapidly as sodium azide (or other pyrotechnics), the addition of such silicon/rubberized materials will generally slow down the burn rate of the pyrotechnic composition.

This slowing of the pyrotechnics' burn rate is a significant concern to airbag/vehicle manufacturers. In fact, manufacturers will often take steps (such as using larger inflators, increasing the amount of the pyrotechnic material, etc.) to ensure that, despite any reduction in burn rate caused by the introduction of a silicon/rubberized binder material, the airbag will still inflate in a timely manner. While measures such as increasing the size of the inflator or the amount of the pyrotechnic material do compensate for the reduction in burn rate, such measures will greatly increase the overall cost and complexity of the airbag systems and are thus not preferred. Increased pyrotechnic material will also lead to an increase in undesirable products of combustion, or effluent values, which is clearly not preferred.

Accordingly, it would be a benefit in the art to provide a new type of pyrotechnic material that would address one or more of the above-recited concerns. Such a pyrotechnic material is disclosed herein.

BRIEF SUMMARY OF THE INVENTION

The present embodiments relate to a novel type of gas generant that may be used as part of an airbag inflator. This gas generant will generally comprise one or more beads that are made of a gas-generating material. The beads are designed such that if ignited, the beads will produce a quantity of inflation gas that may be used to inflate an airbag.

The beads will generally be formed into shapes that are similar to that which are found in beaded necklaces, beaded jewelry, etc. A variety of different bead shapes are possible and within the scope of the present embodiments. Common types of bead shapes include pressed, formed, or molded beads (including "czech-shaped" beads, modified czech-shaped beads), "snake-shaped" beads, cylindrical-shaped beads, circular-shaped beads, oval-shaped beads, etc.

The gas generant will also include a flexible igniter. The flexible igniter is a wire, a string, a cord, a cable, etc. that is capable of igniting the beads. The wire may ignite the beads directly by using a metallic fuzed material (such as aluminum and palladium, or aluminum and platinum, or ruthenium and palladium and aluminum, etc.) which produces enough combustion energy to light the beads. Of course, linear ignition materials (and/or ITLX) may also be used. Alternately, a coating may also be added to the flexible igniter. Generally, the coating is positioned on the exterior of the igniter and comprises a material that is selected to facilitate ignition/combustion of the beads. Accordingly, in some embodiments the coating will comprise a pyrotechnic booster material (such as magnalium and KP, or BKNO3, or similar booster material) that is easily ignited via a simple hot wire, i.e., nichrome wires or another bridgewire for electric explosive devices.

The flexible igniter is sized and configured such that it may be strung through the beads. Accordingly, each of the beads will comprise a connector passage through which the flexible igniter may be strung. In many embodiments, this connector passage will be an aperture that is sized such that the wire may be threaded through the apertures (such as is commonly done with beaded necklaces or beaded jewelry).

By stringing the beads along the flexible igniter, significant advantages may be obtained. For example, the gas generants of the present embodiments are highly flexible, yet do not comprise any flexible binding materials or other additives that will affect the combustion of the beads. Accordingly, the present gas generants are particularly well-suited for side-curtain airbag applications which require that the gas generant be flexible.

When the gas generants of the present embodiments are inserted into an airbag inflator, the flexible igniter will generally be attached to a current source. Accordingly, when the appropriate signal is given indicating that the vehicle is experiencing an accident, the current source will send a quantity of electrical current into the flexible igniter. Current flowing through the igniter (or bridge element) will cause the igniter to greatly increase in temperature or even combust, thus creating ignition heat and energy sufficient to cause the beads to ignite and combust, thus producing a quantity of inflation gas that may be used to inflate the airbag.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the gas generant of the present invention, as represented in FIGS. 1 through 7, is not intended to limit the scope of the invention, as claimed, but is merely representative of presently preferred embodiments of the invention.

Figure 1:
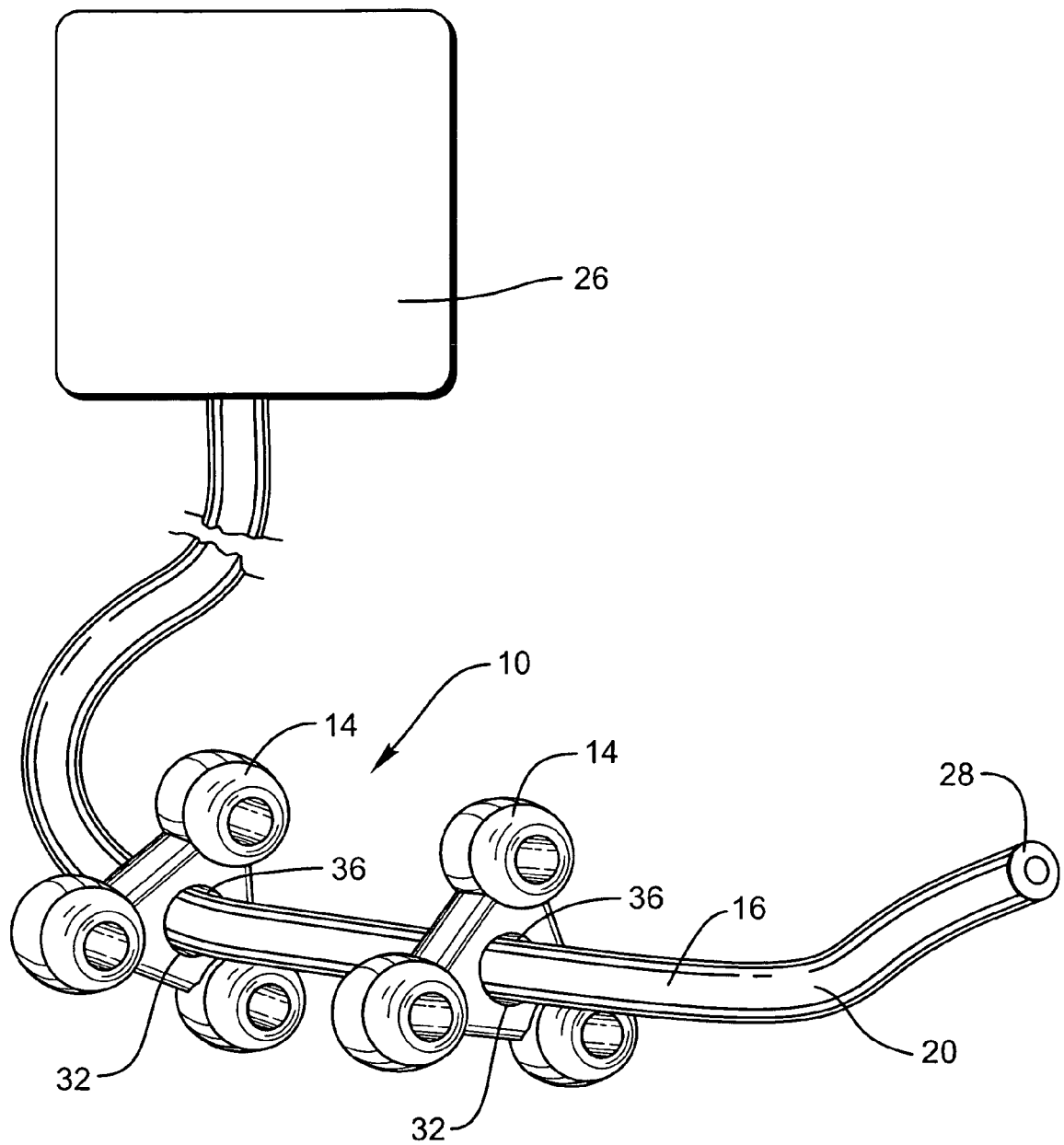
FIG. 1 is perspective view of a gas generant including at least one bead according to the present embodiments.

Referring now to FIG. 1, a perspective view of a flexible gas generant 10 according to the present embodiments is illustrated. The gas generant 10 is designed such that it may be used in an airbag inflator and will generally comprise one or more beads 14. The beads 14 are made from a gas-generating material. As used herein, a "gas-generating material" is a material that produces a quantity of gaseous products when the material is combusted or ignited.

A variety of different materials, including both azide-containing materials and non-azide-containing materials, may be used as the gas-generating material. Some of the presently preferred embodiments will be made in which the gas-generating material used is either MPN-352 or a product from the PNP-409 family. However, other materials may also be used as the gas-generating material. For example, U.S. Pat. No. 5,551,343 (which patent is expressly incorporated herein by reference and will be referred to herein as "'343 patent") teaches a variety of different gas-generating materials which are within the scope of the present embodiments. Of course, other materials which are not listed in the '343 patent may also be used as the gas-generating material.

The beads 14 have been formed by pressing or molding the gas-generating material into the desired shape. Those of skill in the art will recognize a variety of methods by which pressing/molding may be accomplished. Generally, the gas-generating material will be pressed/molded into well-known bead shapes such as the type typically found in jewelry or necklaces. A variety of different bead shapes are possible and within the scope of the invention. For example, in the embodiment shown in FIG. 1, both of the beads 14 are "czech-shaped." Modified czech-shaped beads, "snake-shaped" beads (as shown herein), cylindrical-shaped beads, circular-shaped beads, oval-shaped beads may also be used. Those of skill in the art will recognize that a variety of other shapes of beads may be used.

Although the embodiment shown in FIG. 1 illustrates a gas generant 10 in which all of the beads 14 are identical in shape, this depiction should not be interpreted as being limiting. Other embodiments may also be constructed in which beads 14 of different shapes are used in combination with each other. For example, embodiments may be constructed in which one of the beads 14 is czech-shaped whereas another bead 14 has a snake-shape, etc.

As shown in FIG. 1, the gas generant 10 comprises a flexible igniter 16. As used herein, the term "flexible igniter" means any device that is capable of igniting the beads 14, but also capable of being flexed, bent, angled, twisted, etc. In the embodiment shown in FIG. 1, the flexible igniter 16 comprises an electrical wire 20 that is capable of transmitting electrical current and producing substantial heat in the process. In general, this wire 20 will be constructed of nichrome (nickel and chromium), fuzed metals, or similar material. Other embodiments may also be constructed in which the flexible igniter 16 comprises a string, a cable, a cord, etc. As will be discussed in greater detail below, the flexible igniter 16 will be attached to a current source 26 (represented graphically as a box) that is capable if passing a quantity of electrical current through the flexible igniter 16. In some embodiments, this current source 26 may be a firing box n initiator or other similar device.

A coating 28 may also be added to the flexible igniter 16. Generally, this coating 28 is positioned on the exterior of the igniter 16 and comprises a material that is selected to facilitate ignition/combustion of the beads 14. Accordingly, in some embodiments the coating 28 will comprise any type of igniter or pyrotechnic booster material (including, for example, PIP-1215, magnalium, or KP). In other embodiments, the coating 28 will comprise a metallic fuzed material such as aluminum or ruthenium. In some embodiments, this current source 26 may be a firing box or similar device.

As shown in FIG. 1, the gas generant 10 is designed such that the flexible igniter 16 may be strung through the beads 14, thereby creating a flexible strand. Accordingly, each of the beads 14 will comprise a connector passage 32 through which the flexible igniter 16 may be strung. As used herein, the term "connector passage" means a feature or element through which all or a portion of the flexible igniter 16 may be passed, regardless of the particular size, shape or configuration of the feature. In many embodiments (such as the embodiment of FIG. 1), this connector passage 32 will be an aperture 36 that is sized such that the wire 20 may be threaded through the apertures 36. However, other embodiments may also be constructed in which the connector passage 32 is an eyelet, a hook, a loop, a channel, a ringlet, an extension, etc.

It should also be noted that the location and shape of the connector passage 32 may be adjusted according to the particular embodiment. For example, in the embodiment shown in FIG. 1, the connector passage 32 is located in the middle of the beads 14. However, other embodiments may be constructed in which the aperture 36 is located above the bead 14, on top of the bead 14, on a bottom portion of the bead 14, on a side portion of the bead 14, etc. Likewise, the connector passage 32 in FIG. 1 is shown as having a round (or substantially round) shape. Other embodiments may also be constructed in which the connector passage 32 has an oval, oblong, or "fin" shape. In yet further embodiments, the shape of the aperture 36 is adjusted in order to tailor the ignition or burn rate of the beads 14.

Figure 2:
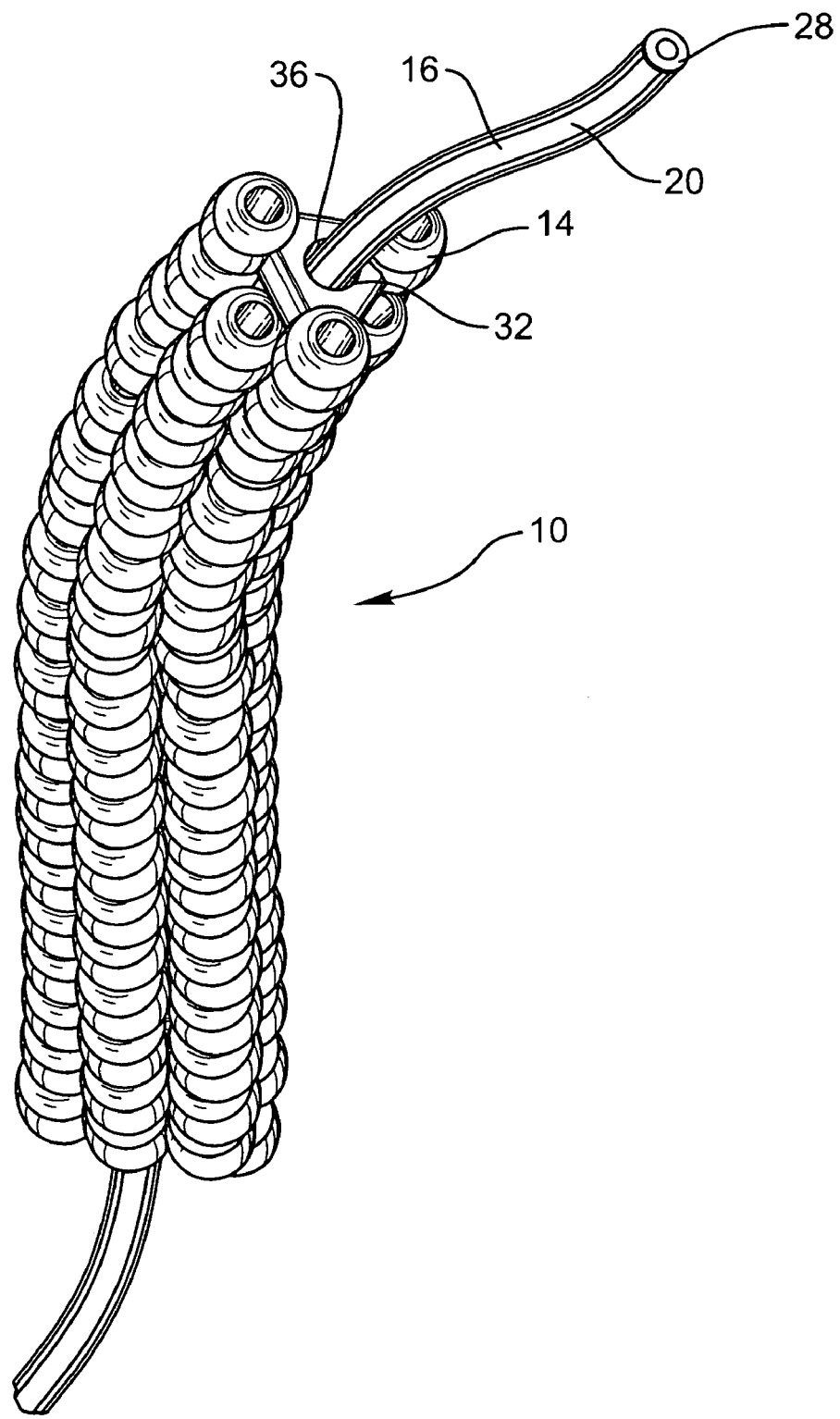
FIG. 2 is a perspective view of another embodiment of the gas generant of FIG. 1.

Referring now to FIG. 2, a perspective view illustrates another embodiment of the gas generant 10 shown in FIG. 1. As shown in FIG. 2, the gas generant 10 is designed such that when the beads 14 are strung on the flexible igniter 16, the adjacent beads 14 will restrict rotational movement of each other. More specifically, the beads 14 are fit together such that the adjacent beads 14 will contact each other and will prevent each other from undergoing free rotational movement. In some embodiments, such "fitting together" of the beads 14 may be accomplished by stringing the beads 14 so that adjacent beads 14 are rotated and/or inverted with respect to each other. In many applications, such "fitting together" of the beads 14 may be desirable in that it helps to maintain the beads 14 in the proper position.

As shown in FIG. 2, one of the advantages of the gas generant 10 is that the strands of beads 14 are highly flexible. In other words, once the beads 14 have been strung on the flexible igniter 16, the gas generant 10 may be curved, bent, flexed, twisted, etc. very easily and efficiently, without having any effect on the ability of the gas generant 10 to rapidly and adequately inflate the airbag. Accordingly, the strands of gas generant 10 are particularly suited for use in situations (such as side-curtain airbag systems) in which a flexible gas generant is needed.

Moreover, it should also be noted that the "flexibility" of the gas generant 10 is not generated via the inclusion of flexible binding material (such as silicon, a rubberized binder material, etc.) such as is done in previously known systems. In fact, the embodiment of the gas generant 10 shown in FIG. 2 has been constructed in which the gas generant 10 lacks any sort of flexible binding material. Rather, the flexibility and pliancy of the gas generant 10 is facilitated by the pliancy of the flexible igniter 16 and/or the beads 14. Accordingly, the gas generant 10 will not suffer from the limitations/drawbacks that are associated with gas generating materials containing a flexible binding material and will thus be preferred over these previously known systems.

Figure 3:
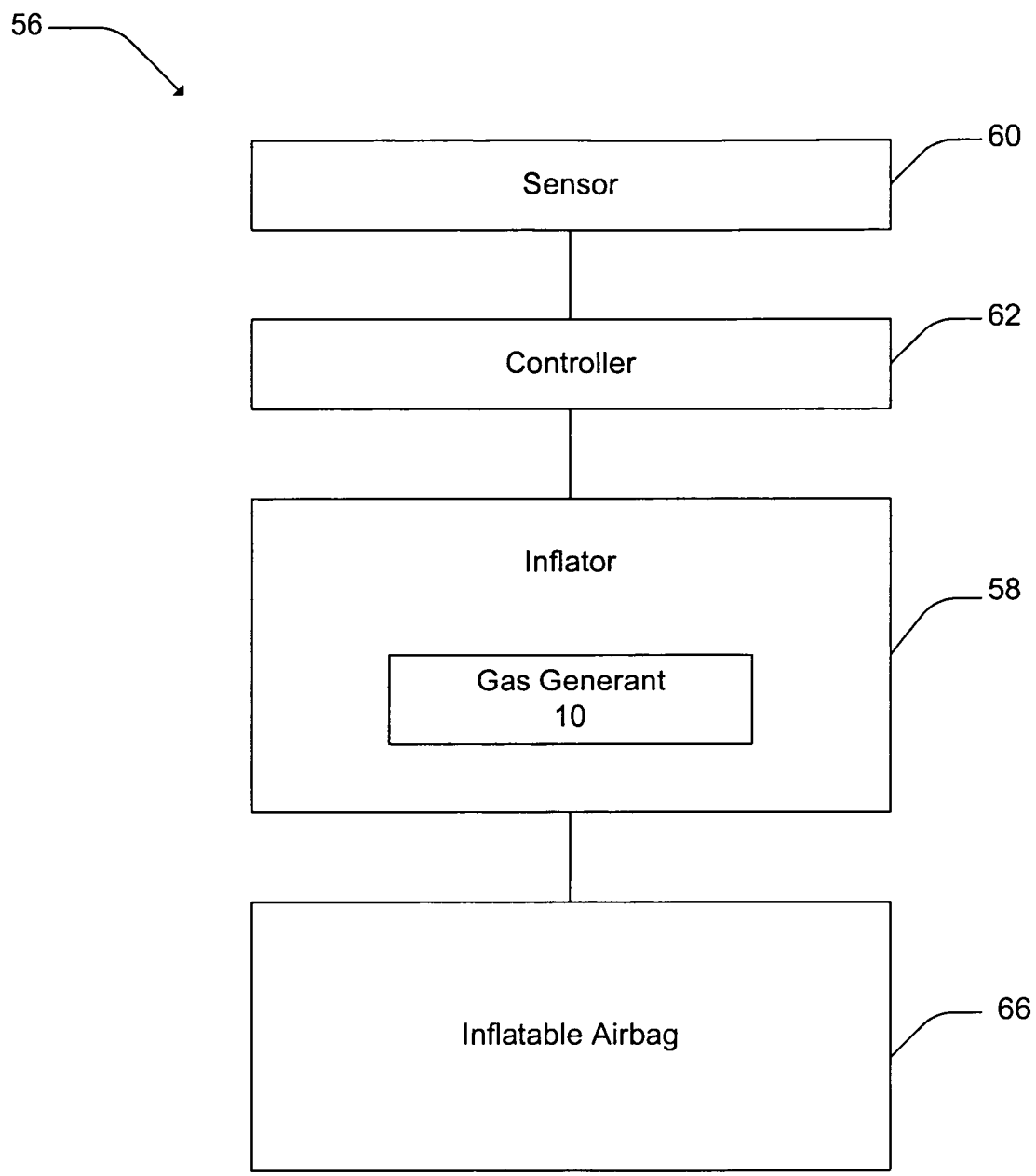
FIG. 3 is schematic view of an airbag system that incorporates the gas generant of FIG. 1.

FIG. 3 is a schematic view that illustrates the way in which the gas generant 10 may be used as part of an airbag system 56. Specifically, the gas generant 10 has been incorporated as part of an airbag inflator 58 that is part of the airbag system 56. As is known in the art, the airbag system 56 may be incorporated into the interior of a motor vehicle and used to protect the vehicle occupant from harmful impact during the crash.

As is commonly known in the art, the airbag system 56 will include a sensor 60 and a controller 62. The sensor 60 is a device that senses when the vehicle is experiencing a crash. Once the sensor 60 detects the crash conditions, the sensor 60 will signal this occurrence to the controller 62. Upon receipt of this signal from the sensor 60, the controller 62 will send a signal to the inflator 58 which will cause the inflator to actuate and produce a large quantity of gas. This gas will then be used to inflate the airbag 66.

Referring now to FIGS. 1-3 collectively, the operation of the gas generant 10 within the inflator 58 will now be discussed. Upon receipt of the signal from the controller 62, the inflator 58 will produce the inflation gas by combusting/igniting the beads 14. Specifically, upon receipt of the signal from the controller 62, the current source 26 will cause electrical current to flow through the flexible igniter 16, initiating combustion of the igniter 16 and/or the igniter coating 28 which in turn starts the combustion of the generant beads 14. Combustion of the beads 14 produces the quantity of gas needed to inflate the airbag.

It should be noted that, in some embodiments, the flexible igniter 16 will initiate combustion in all the beads 14 and cause the beads 14 to ignite simultaneously (or nearly simultaneously). However, in other embodiments, the flexible igniter 16 may be designed such as to ignite the first bead 14 (or first portion of beads 14 in the strand) and then the remaining beads 14 are ignited as part of a "chain reaction" that is caused by the ignition of the first portion of beads 14. Of course, other mechanisms for igniting the beads 14 may also be used.

Figure 4A:
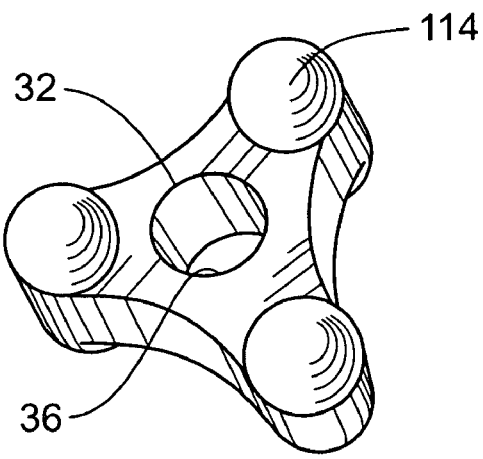
FIGS. 4A and 4B are perspective views of different bead shapes that may be used in the gas generant shown in FIG. 1.
Figure 4B:
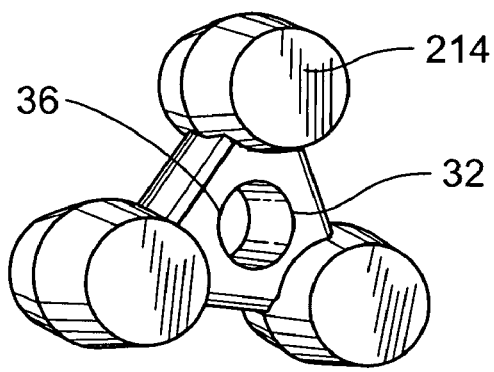

Referring now to FIGS. 4A and 4B, additional embodiments of the present invention are illustrated. More specifically, FIGS. 4A and 4B represent additional examples of shapes that may be used as the beads 14 within the gas generant 10. These beads, which are referred to as beads 114 and 214, are identical to the beads 14 discussed above except that these beads 114, 214 have a "modified czech-shape" rather than a "czech shape." Such beads 114, 214 may be used in conjunction with and/or in place of the beads 14 discussed above. Those of skill in the art will recognize that these bead shapes 114, 214 represent only two examples of the modified czech-shaped bead that may be made as part of the present embodiments. Other configurations and/or shapes of the beads 114, 214 are also within the scope of the present patent.

Figure 5:
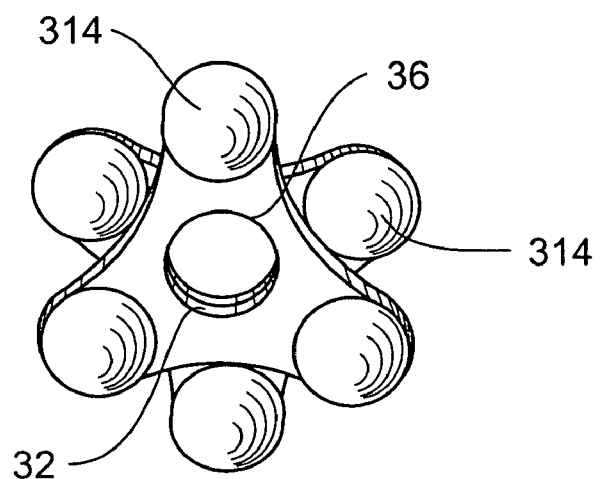
FIG. 5 is a perspective view of a different bead shape that may be used in the gas generant of FIG. 1.

Referring now to FIG. 5, an additional bead configuration that may be used as part of the gas generant 10 is illustrated. Specifically, in FIG. 5, two beads 314 are shown as being fit together. More specifically, these beads 314 are fit together such that these beads 314 will restrict the rotational movement of each other. Again, such a configuration of beads 314 will hold the beads 314 in the proper position, but will still allow the beads to be flexible. Accordingly, in some applications, this configuration of beads 314 may be preferred.

Figure 6:
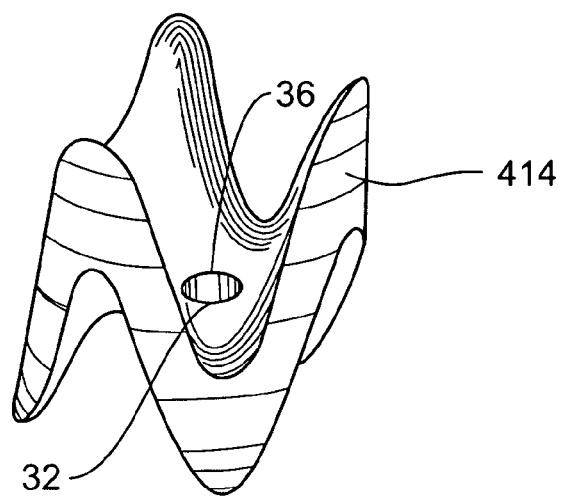
FIG. 6 is a perspective view of a different bead shape that may be used in the gas generant according to FIG. 1.
Figure 7:
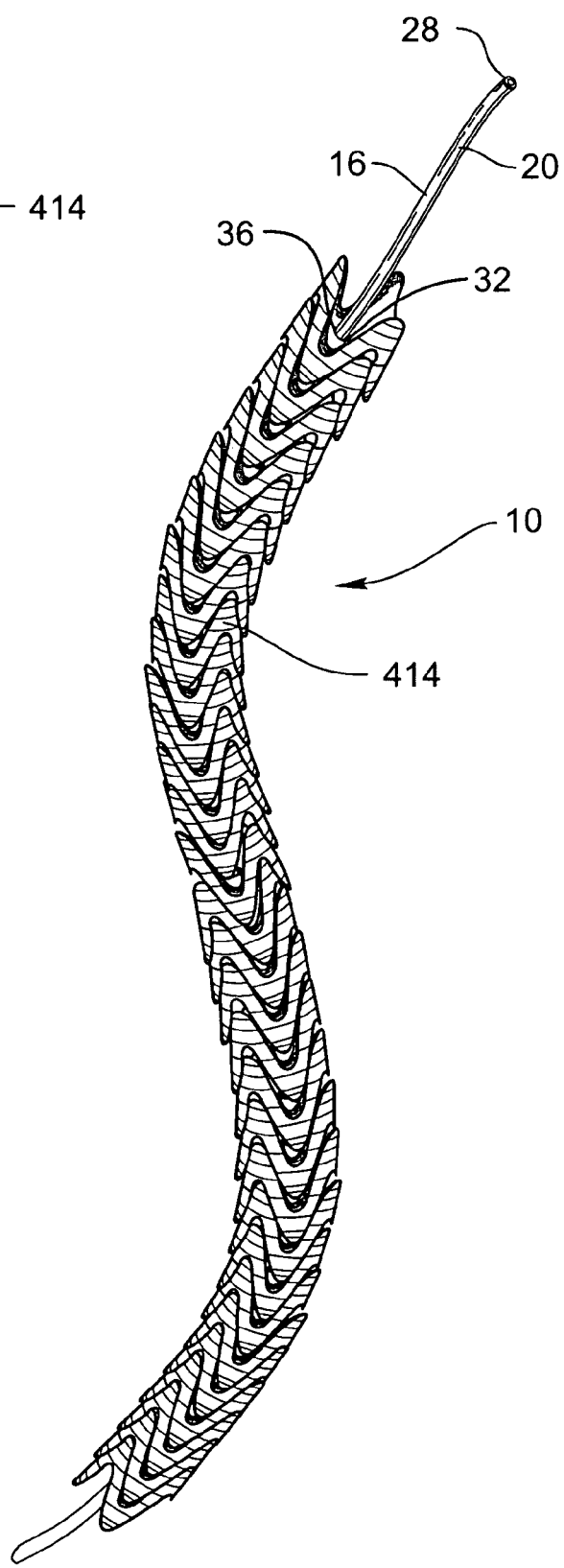
FIG. 7 is a perspective view of another embodiment of the gas generant shown in FIG. 6.

Referring now to FIGS. 6 and 7, an additional embodiment of beads 414 that may be used in conjunction with the gas generant 10 are illustrated. FIG. 6 is a perspective view that is similar to FIG. 4A, whereas FIG. 7 is a perspective view that is similar to FIG. 2. However, the main difference between FIGS. 6 and 7 and the previous Figures is that in FIGS. 6 and 7, the beads 414 are "snake-shaped" rather than "czech-shaped." As with the embodiments discussed above, the snake-shaped beads 414 create a flexible system that may be used in airbag inflators. At the same time, the snake-shaped beads are also designed to fit together and restrict rotational movement of adjacent beads. Of course, those skilled in the art will realize that other types and shapes of beads may also be used as part of the gas generant 10.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A flexible gas generant comprising:
   a flexible igniter;
   one or more non-cylindrical beads made entirely of a gas-generating material, wherein each bead has a connector passage through which the flexible igniter is strung creating a flexible strand.

2. The gas generant as in claim 1 wherein the flexible igniter is capable of igniting the beads and causing the beads to produce a quantity of gas.

3. The gas generant as in claim 1 wherein at least one of the beads is a snake-shaped bead.

4. The gas generant as in claim 1 wherein at least one of the beads is a czech-shaped bead.

5. The gas generant as in claim 1 wherein the flexible igniter comprises a coating that is selected from the group consisting of PIP-1215, magnalium, and KP.

6. The gas generant as in claim 1 wherein the flexible igniter comprises a hot wire (typically nichrome) that may or may not be coated with a booster material (such as magnalium and KP), or comprised of metallic fuzed materials.

7. The gas generant as in claim 1 wherein the heads are constructed free from a flexible binding material.

8. The gas generant as in claim 1 wherein the beads are strung on the igniter such that each bead restricts rotational movement of each adjacent bead.

9. The gas generant as in claim 1 wherein the flexible igniter is a wire.

10. The gas generant as in claim 1 wherein the connector passage is an aperture.

11. The gas generant as in claim 10 wherein the shape of the shape of the aperture is adjusted in order to tailor the burn rate of the beads.

12. A non-cylindrical gas generant bead comprising:
    a gas-generating material having a shape comprising a connector passage, wherein the non-cylindrical beads are further shaped to engage with and restrict rotational movement of an adjacent bead.

13. A gas generant bead as in claim 12 wherein the shape of the bead is selected from the group consisting of czech-shaped and snake-shaped.

14. A gas generant bead as in claim 12 wherein the bead is shaped such that a plurality of beads may be strung together by passing a flexible igniter through the connector passage.

15. A gas generant bead as in claim 12 wherein the bead is free from a flexible binding material.

16. The gas generant as in claim 1 wherein the flexible strand is capable of being bent at a 90 degree angle.

* * * * *

UNITED STATES PATENT AND TRADEMARK OFFICE
CERTIFICATE OF CORRECTION

| | | |
|---|---|---|
| PATENT NO. | : 7,455,741 B2 | Page 1 of 1 |
| APPLICATION NO. | : 11/326528 | |
| DATED | : November 25, 2008 | |
| INVENTOR(S) | : Brett Hussey et al. | |

It is certified that error appears in the above-identified patent and that said Letters Patent is hereby corrected as shown below:

In column 5, line 30, please replace "bum rate of the beads" with --burn rate of the beads--

Column 8, line 8, in claim 7, please replace "heads are constructed" with --beads are constructed--

Column 8, line 12, in claim 11, please replace "the shape of the shape of the aperture" with --the shape of the aperture--

Signed and Sealed this

Twenty-fifth Day of August, 2009

David J. Kappos
*Director of the United States Patent and Trademark Office*